(12) United States Patent
Bianco

(10) Patent No.: US 9,118,706 B2
(45) Date of Patent: Aug. 25, 2015

(54) USING IMPORTED DATA FROM SECURITY TOOLS

(75) Inventor: Scott V. Bianco, Suffern, NY (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 2536 days.

(21) Appl. No.: 11/772,078

(22) Filed: Jun. 29, 2007

(65) Prior Publication Data

US 2009/0007269 A1    Jan. 1, 2009

(51) Int. Cl.
*H04L 29/06* (2006.01)

(52) U.S. Cl.
CPC ............ *H04L 63/1433* (2013.01); *H04L 63/20* (2013.01)

(58) Field of Classification Search
CPC ............................ H04L 63/20; H04L 63/1433
USPC .......................................................... 726/25
See application file for complete search history.

(56) References Cited

U.S. PATENT DOCUMENTS

| | | | |
|---|---|---|---|
| 5,931,946 A * | 8/1999 | Terada et al. ..................... 726/25 |
| 6,185,689 B1 * | 2/2001 | Todd et al. ....................... 726/25 |
| 6,925,443 B1 * | 8/2005 | Baggett et al. ................... 705/10 |
| 6,944,775 B2 * | 9/2005 | Barton et al. .................. 713/188 |
| 7,013,395 B1 * | 3/2006 | Swiler et al. ..................... 726/25 |
| 7,325,252 B2 * | 1/2008 | Bunker et al. ................... 726/25 |
| 7,340,776 B2 * | 3/2008 | Zobel et al. ...................... 726/24 |
| 7,664,845 B2 * | 2/2010 | Kurtz et al. .................... 709/224 |
| 7,788,722 B1 * | 8/2010 | Njemanze et al. .............. 726/23 |
| 8,601,530 B2 * | 12/2013 | Cohen et al. ....................... 726/1 |
| 2003/0126472 A1 * | 7/2003 | Banzhof ......................... 713/201 |
| 2004/0205374 A1 * | 10/2004 | Poletto et al. ..................... 714/4 |
| 2004/0250116 A1 * | 12/2004 | Strickland et al. ............ 713/201 |
| 2005/0005169 A1 * | 1/2005 | Kelekar ......................... 713/201 |
| 2006/0101263 A1 * | 5/2006 | Costea et al. .................. 713/164 |
| 2007/0067846 A1 * | 3/2007 | McFarlane et al. ............. 726/25 |
| 2008/0235801 A1 * | 9/2008 | Soderberg et al. .............. 726/25 |

OTHER PUBLICATIONS

Josse, S., 'Malware Dynamic Recompilation', IEEE,2014, entire document, http://ieeexplore.ieee.org/stamp/stamp.jsp?arnumber=6759227.*

Palo Alto Networks, 'Content-ID Technology Brief', Palo Alto Networks, Inc., 2014, entire document, https://www.paloaltonetworks.com/content/dam/paloaltonetworks-com/en_US/assets/pdf/tech-briefs/techbrief-content-id.pdf.*

* cited by examiner

*Primary Examiner* — Bradley Holder
*Assistant Examiner* — Ronald Baum

(57) ABSTRACT

A device may create a new project that includes criteria, import findings from a group of different network security tools into the new project based on the criteria, normalize the imported findings, and store the normalized findings.

21 Claims, 18 Drawing Sheets

| | | | | | | | |
|---|---|---|---|---|---|---|---|
| File | Edit | View | Go | Bookmarks | Tools | Help | |

VADER Host Analysis - Mozilla Firefox

| Admin | Host Analysis | Vulns | NMAP | Nikto | Kismet | Combined | Import | Reporting | Findings DB | LOGOUT | wigets incorporated ▼

Host(s) returned: 32

| IP | Hostname |
|---|---|
| 10.0.0.1 | host.wigits.com |
| 10.0.0.2 | host1.wigits.com |
| 10.0.0.3 | host2.wigits.com |
| 10.0.0.4 | host3.wigits.com |
| 10.0.0.5 | host4.wigits.com |
| 10.0.0.6 | host5.wigits.com |
| 10.0.0.7 | host6.wigits.com |
| 10.0.0.8 | host7.wigits.com |
| 10.0.0.9 | host8.wigits.com |
| 10.0.0.10 | host9.wigits.com |
| 10.0.0.11 | host10.wigits.com |
| 10.0.0.12 | host11.wigits.com |
| 10.0.0.13 | host12.wigits.com |
| 10.0.0.14 | host13.wigits.com |
| 10.0.0.15 | host14.wigits.com |
| 10.0.0.16 | host15.wigits.com |
| 10.0.0.17 | host16.wigits.com |
| 10.0.0.18 | host17.wigits.com |
| 10.0.0.19 | host18.wigits.com |
| 10.0.0.20 | host19.wigits.com |
| 10.0.0.21 | host20.wigits.com |
| 10.0.0.22 | host21.wigits.com |
| 10.0.0.23 | host22.wigits.com |
| 10.0.0.24 | host23.wigits.com |
| 10.0.0.25 | host24.wigits.com |
| 10.0.0.26 | host25.wigits.com |
| 10.0.0.27 | host26.wigits.com |
| 10.0.0.28 | host27.wigits.com |
| 10.0.0.29 | host28.wigits.com |
| 10.0.0.30 | host29.wigits.com |
| 10.0.0.31 | host30.wigits.com |

☑ Show: rDNS

○ Filter Host(s) with High Severity findings
○ Filter Host(s) with Medium Severity findings (or greater)
○ Filter Host(s) with Low Severity findings (or greater)
⦿ Any ⦿ All host in Project
○ Nmap pingscan-hosts pingable
○ Nmap port scan-hosts with open ports
○ Nmap-hosts pingableOR with open ports
○ Nmap port scan-hosts with %http% or %web% ports open
○ Nessus port scan-hosts with %http% or %web% ports open
○ Nessus found but nmap didn't (ignore severity filtering)
○ Nmap found but nessus didn't (ignore severity filtering)
○ Host(s) marked "Interesting"
○ Host(s) marked "Interesting" nessus results
○ Host(s) marked with Custom Findings (ignore severity filtering)
○ Host(s) marked with "Interesting" nessus results OR Custom Findings simple nmap report
simple nessus report All... ▼ Select Host Catagory Done

Fig. 15

USING IMPORTED DATA FROM SECURITY TOOLS

BACKGROUND INFORMATION

Many security tools are available for evaluating and providing reports on system security. Each tool may use its own approach in evaluating different aspects of security risks and may offer its own format for displaying or reporting results of tests that the tool performs.

BRIEF DESCRIPTION OF THE DRAWINGS

FIG. 11 is a diagram of an exemplary browser that shows a host analysis view of FIG. 9;

FIG. 12 is a diagram of an exemplary browser that shows a vulnerability analysis view of FIG. 9;

FIG. 13 is a diagram of an exemplary browser that shows another vulnerability analysis view of FIG. 9;

FIG. 15 is a diagram of an exemplary browser that shows a findings database view of FIG. 9;

DETAILED DESCRIPTION OF PREFERRED EMBODIMENTS

The following detailed description refers to the accompanying drawings. The same reference numbers in different drawings may identify the same or similar elements.

A "finding," as used herein, may refer to a specific vulnerability or weakness or to a characteristic that is discovered through a set of scans or tests that are performed on the system. Depending on context, a "finding" may also refer to a record, a log, or a description of a finding.

In the following implementations, a user may import findings and/or other data from many different security tools and combine them, present a comprehensive view of the imported findings/data, track and edit the combined findings/data, add supporting documentation to combined findings/data, generate reports about the combined findings/data, and/or perform other operations on the findings/data.

Figure 1:
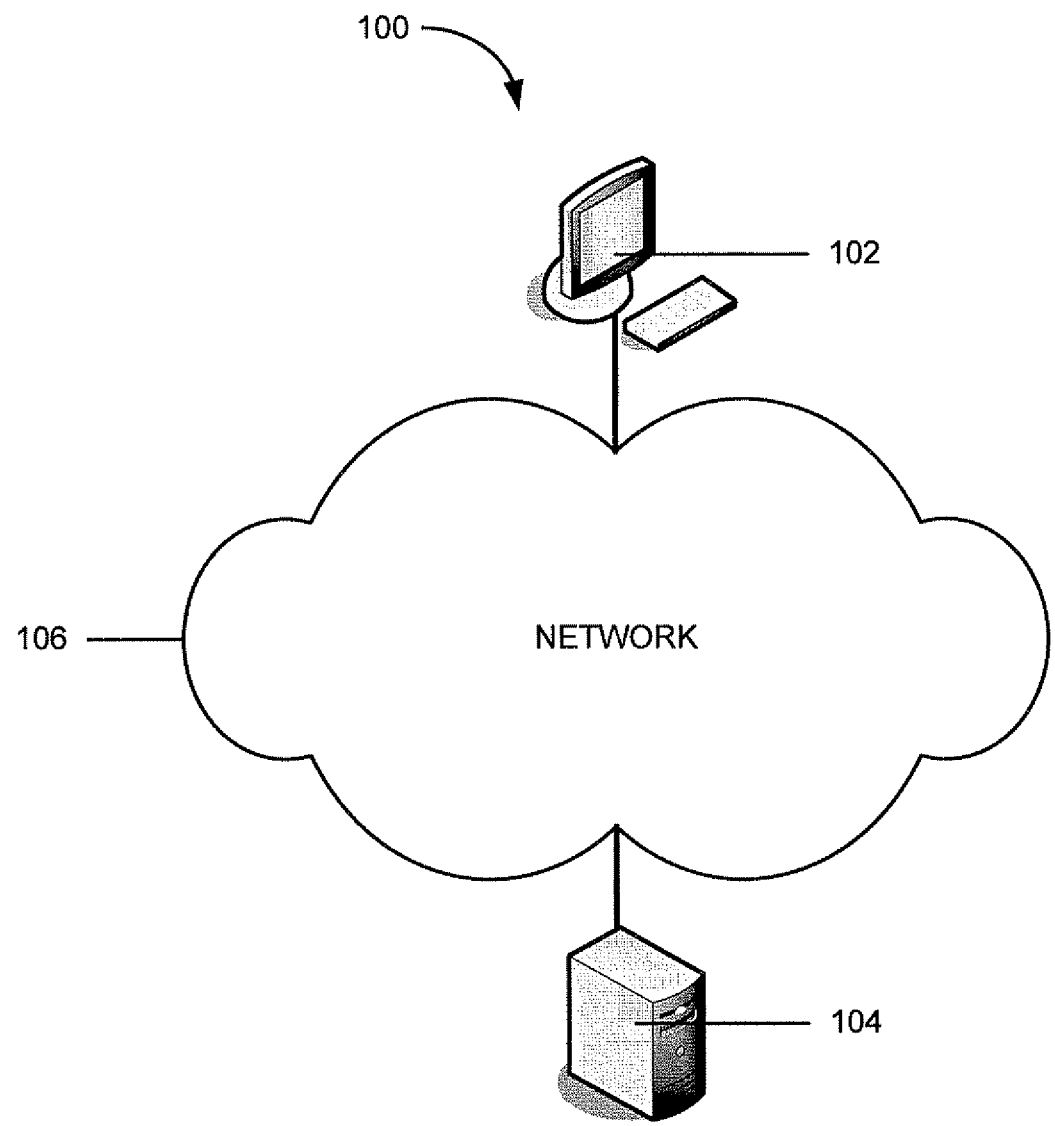
FIG. 1 shows an exemplary environment in which concepts described herein may be implemented.

FIG. 1 shows an exemplary environment in which concepts described herein may be implemented. As shown, system 100 may include a client device 102, a server device 104, and a network 106. In other implementations, system 100 may include more, fewer, or different components. Moreover, one or more of the functions described below as being performed by one component of system 100 may be performed by one or more other components of system 100.

Client device 102 may include, for example, a personal computer (PC); a laptop; an electronic notepad; a personal digital assistant (PDA) that can include a web browser, organizer, calendar; or another type of computation or communication device that includes a browser or a client that comprehends a hypertext markup language (HTML).

Server device 104 may include one or more computer systems for hosting server programs and/or applications. Server device 104 may receive data or information from client applications that may be hosted by client device 102 or another device, process the data/information, and transmit data/information to client device 102.

Network 106 may include the Internet, an ad hoc network, a local area network (LAN), a wide area network (WAN), a metropolitan area network (MAN), a cellular network, a public switched telephone network (PSTN), any other network, or combinations of networks. Client device 102 and/or server device 104 may connect to network 106 via wireless communication links or wired connections.

Figure 2:
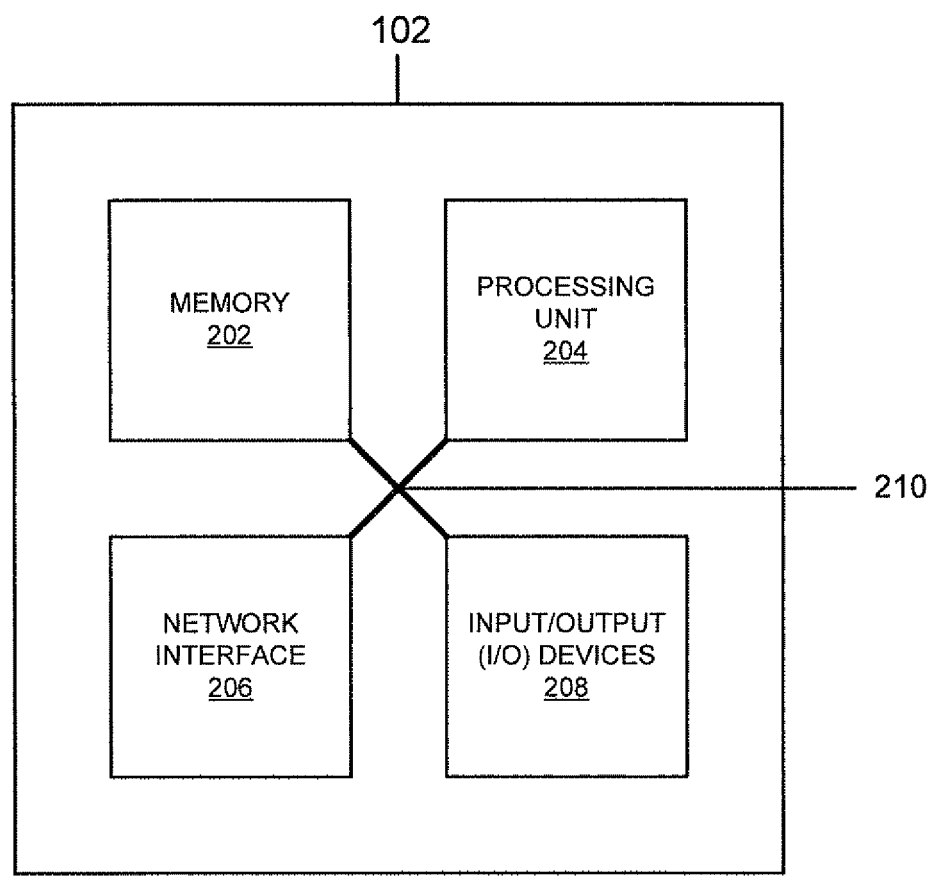
FIG. 2 is a block diagram of an exemplary server device of FIG. 1.

FIG. 2 shows an exemplary block diagram of server device 104. As shown, server device 104 may include memory 202, a processing unit 204, a network interface 206, input/output devices 208, and a bus 210. In other implementations, server device 104 may include additional, fewer, or different components.

Memory 202 may include static memory, such as a read only memory (ROM), and/or a dynamic memory, such as a random access memory (RAM), an onboard cache, etc., for storing data and machine-readable instructions. Memory 202 may also include storage devices, such as a floppy disk, compact disk (CD), and/or flash memory, as well as other types of storage devices. Processing unit 204 may include one or more processors, microprocessors, and/or processing logic capable of controlling server device 104.

Network interface 206 may include any transceiver-like mechanism that enables server device 104 to communicate with other devices and/or systems. For example, network interface 206 may include mechanisms for communicating with other devices on a network, such as network 106. Additionally or alternatively, network interface 206 may include an Ethernet interface and/or an interface/connection for connecting server device 104 to other devices (e.g., a Bluetooth interface).

Input/output (I/O) devices 208 may include a display (e.g., a liquid crystal display (LCD), a cathode ray tube (CRT) display, etc.), a mouse, a speaker, a Digital Video Disk (DVD) writer, a DVD reader, Universal Serial Bus (USB) lines, and/or other types of devices for converting physical events or phenomena to and/or from digital signals that pertain to server device 104. Bus 210 may provide an interface through which components of server device 104 can communicate with one another.

Figure 3:
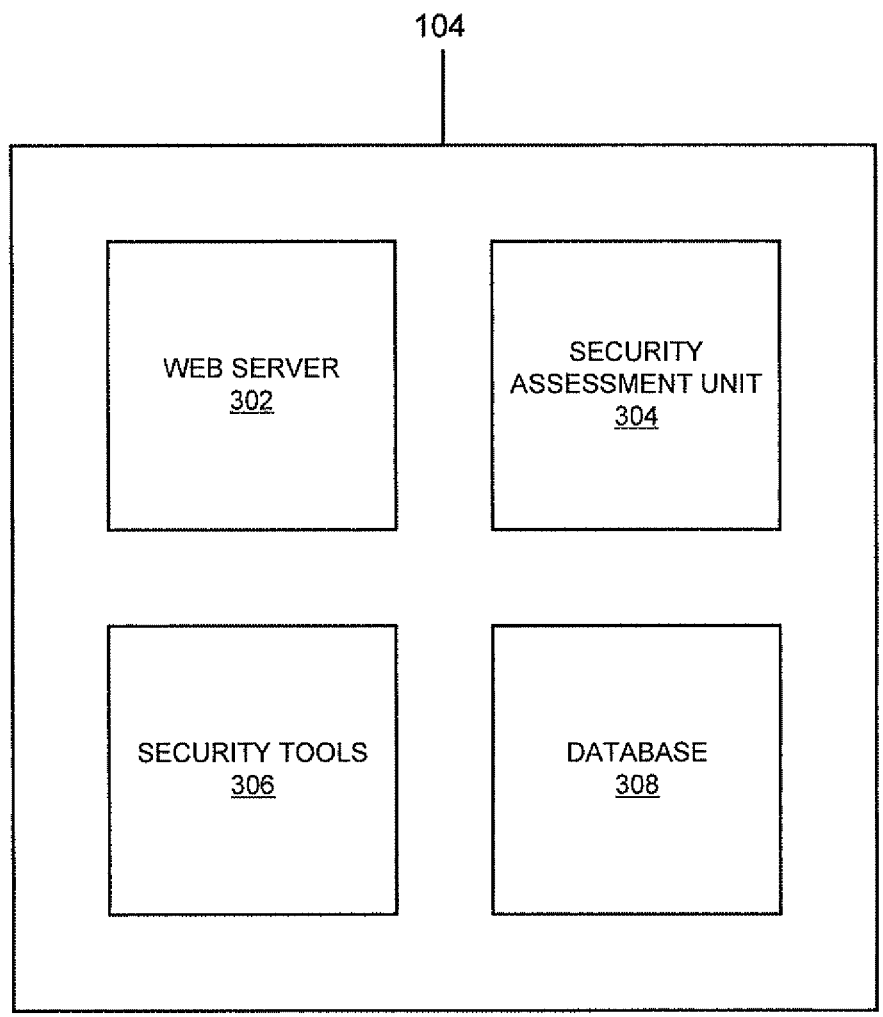
FIG. 3 is a functional block diagram of the server device of FIG. 2.

FIG. 3 is a functional block diagram of an exemplary server device 104. As shown, server device 104 may include a web server 302, a security assessment unit 304, security tools 306, and database 308. In other implementations, server device 104 may include fewer, additional, or different types of components than those illustrated in FIG. 3.

Web server 302 may include hardware and/or software for receiving information from client applications, such as a browser or web services clients and for sending web resources (e.g., web pages) to client applications. For example, web server 302 may send files to client device 102. In exchanging information with client devices and/or applications, web server 302 may operate in conjunction with other components, such as security assessment unit 304, security tools 306, and database 308.

Security assessment unit 304 may include hardware and/or software for importing and combining data from security tools 306, for tracking, filtering and editing the combined data, and for generating reports about the combined data. In performing various functions, security assessment unit 304 may interoperate with other components, such as web server 302, security tools 306, and/or database 308. For example, security assessment unit 304 may receive a request for a set of data via web server 302, fetch the set of data in database 308, and return the set of data to web server 302 for presentation. In some implementations, security assessment unit 304 may be implemented in an interpreted language (e.g., PHP: Hypertext Preprocessor (PHP), Practical Extraction and Report Language (PERL), JavaScript, etc.). In other implementations, security assessment unit 304 may be implemented in binaries, as the result of compiling source code written in languages such as C, C++, Java, Formula Translator (FORTRAN), PASCAL, Visual Basic, etc.

Security tools 306 may include hardware and/or software for performing different types of security checks on systems and devices on network 106. For example, security tools 306 may include tools that can scan for open ports on hosts (e.g., Network Mapper (NMAP), Unicornscan, Nessus, Nexpose™, Nikto, Kismet, etc.). If desired, new tools may be added to security tools 306.

Database 308 may act as an information repository for other components of server device 104. For example, security assessment unit 304 may store in database 308 information that is imported from security tools 306. In another example, web server 302 may retrieve and/or store information for creating dynamic web pages to/from database 308.

Figure 4:
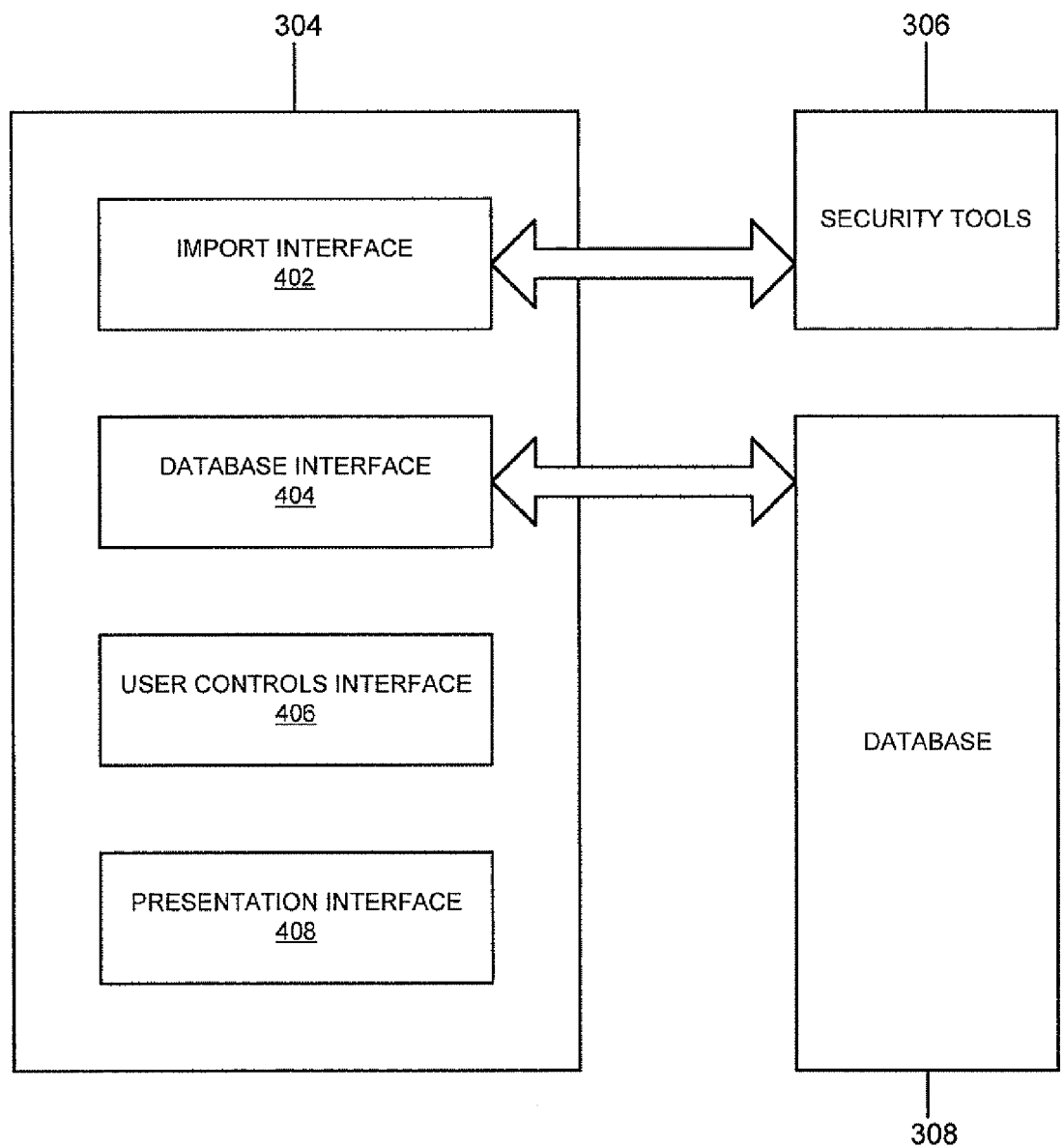
FIG. 4 is a functional block diagram of an exemplary security assessment unit of FIG. 3.

FIG. 4 is a functional block diagram of an example implementation of security assessment unit 304. As shown, security assessment unit 304 may include an import interface 402, a database interface 404, a user controls interface 406, and presentation interface 408. In other implementations, security assessment unit 304 may include fewer, additional, or different components than those illustrated in FIG. 4. For example, security assessment unit 304 may include a scheduler interface for scheduling various network data to be imported at selected time periods.

Import interface 402 may include components that obtain data, process the data (e.g., interpret, parse, normalize, etc.) and store the data in database 308. FIG. 4 shows import interface 402 importing data from security tools 306. In addition, import interface 402 may import findings, which may include noticeable features (e.g., a weakness or vulnerability, etc.) in devices or networks that are tested by one or more of the components in security tools 306.

Database interface 404 may include components for retrieving and/or storing data that pertains to security assessment unit 304 (e.g., findings).

User controls interface 406 may include components for accessing some of the functionalities of import interface 402, database interface 404, and presentation interface 408. For example, if a user is presented with checkboxes for selecting an item, by clicking on one or more of the checkboxes and submitting the result to security assessment unit 304 via web server 302, the user may activate user controls interface 406.

Presentation interface 408 may include components for providing specific views that may be presented at a client. For example, a presentation interface 408 may provide a view (e.g., a set of graphical objects) that may be loaded into a browser at client device 102.

Figure 5:
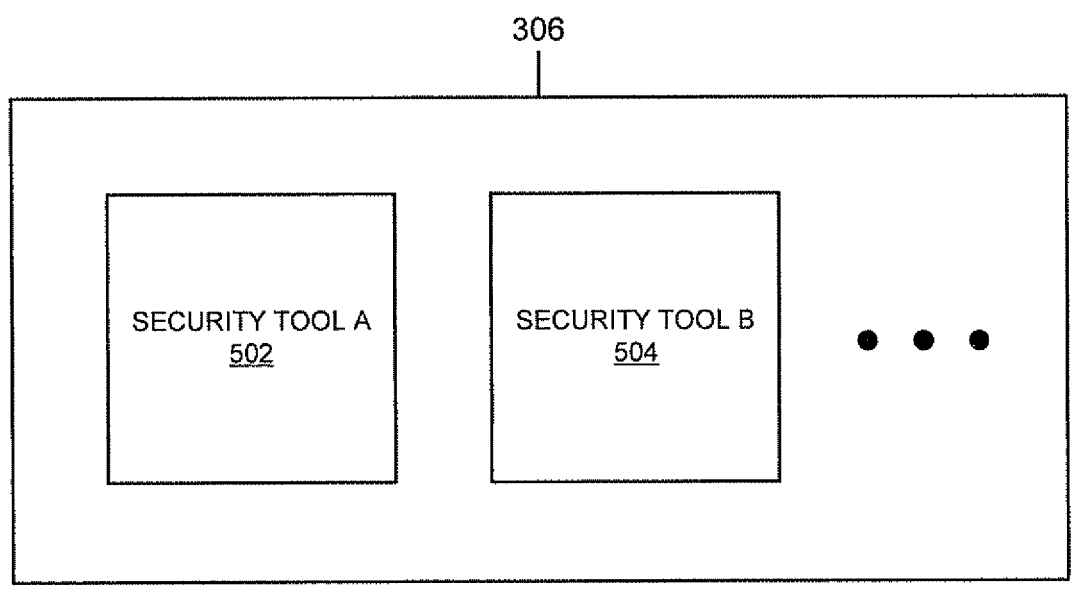
FIG. 5 is a functional block diagram of exemplary security tools of FIG. 3.

FIG. 5 is a functional block diagram of an example implementation of security tools 306, from which import interface 402 may import data. As shown, security tools 306 may include security tool A 502, security tool B 504, etc. Examples of security tools may include Network Mapper (NMAP), Unicornscan, Nessus, Nexpose™, Nikto, and Kismet. The components that are shown in FIG. 5 may generate data that may be used by security assessment unit 304. In some implementations, security tools 306 may include additional, fewer, or different components than those shown in FIG. 5.

Each security tool (i.e., security tool A 502, security tool B 504, etc.) may perform a set of security checks. For example, security tool A 502 may discover and/or identify hosts/computer on a network, enumerate open ports on one or more target hosts, interrogate network services to identify service applications and their versions, determine operating systems and hardware properties of network devices, and/or scan TCP/IP ports, User Datagram Protocol (UDP) ports, remote operating systems (OSs) and applications. In addition, security tool A 502 may test if a machine is vulnerable to unauthorized access or denial-of-service attacks or if an operating system and/or other applications have been updated with the latest security patches.

Security tool B 502 may include software for scanning and/or testing vulnerabilities of web applications, databases, operating systems, and network devices. In addition, security tool B may perform comprehensive tests against web servers for misconfigurations, outdated software and modules, version specific problems, authentications, etc.

Figure 6:
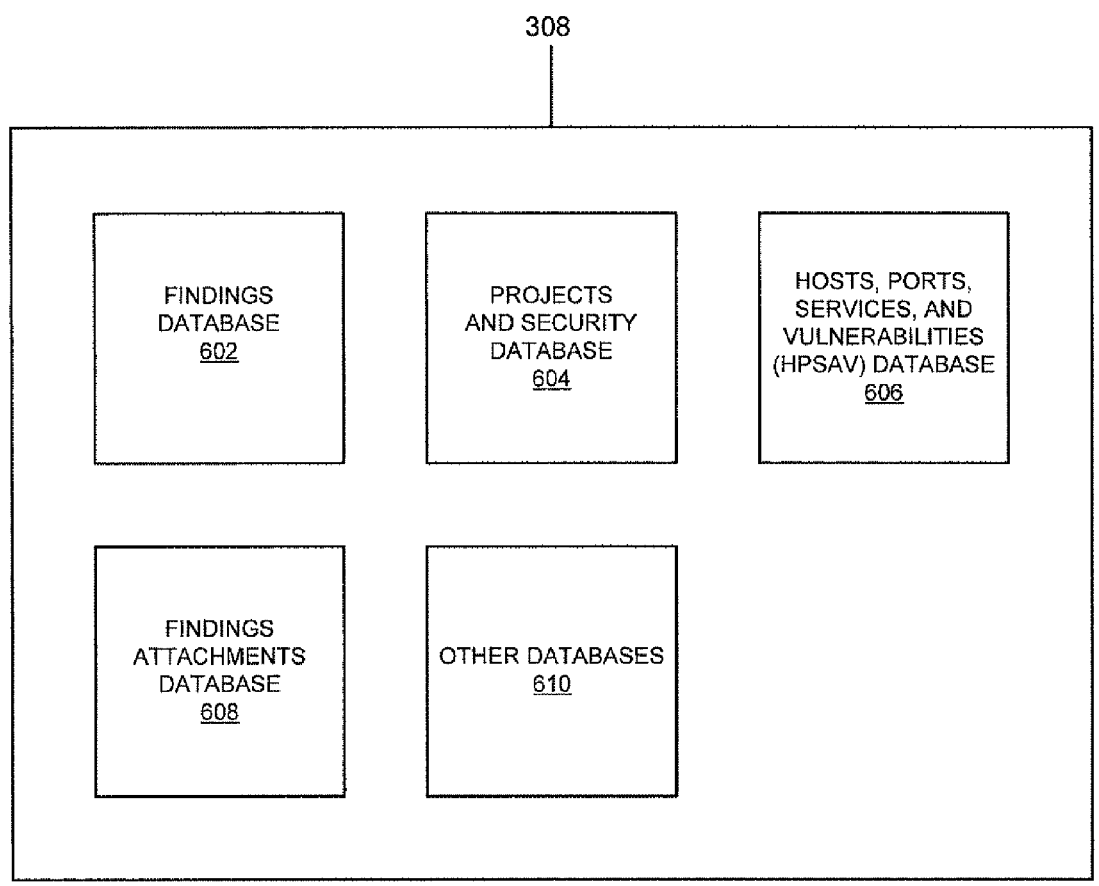
FIG. 6 is a functional block diagram of an exemplary database of FIG. 3.

FIG. 6 shows a functional block diagram of an example implementation of database 308. As shown, database 308 may include findings database 602, projects and security database 604, a Hosts Ports Services and Vulnerabilities (HPSAV) database 606, a findings attachments database 608, and other databases 610. Database 308 may include fewer, additional, or different components than those illustrated in FIG. 6.

Findings database 602 may include a historical collection of one or more findings that have been created in security assessment unit 304, imported from security tools 306 via import interface 402, etc. Findings database 602 may be viewable and may allow customization of each finding to be maintained apart from sources of the finding. The customization may involve modification of a description of the finding, the severity of a vulnerability associated with the finding, and solutions for fortifying a device.

Projects and security database 604 may include one or more sets of imported and normalized data that are organized into projects. The projects may provide a framework for security (e.g., integrity, confidentiality, availability, etc.), and accordingly, projects and security database 604 may include authentication and resource access privilege information that pertains to users and/or projects. In one implementation, authentication and resource access privilege information may be related to the user that creates a project (e.g., a user identifier (ID) and a password). A user may grant access privileges (e.g., viewing privileges, editing privileges, etc.) for a created project to other users. In certain implementations, projects and security database 604 may indicate if a user has the proper privilege to delete a finding in database 308.

HPSAV database 606 may include a list of servers, open ports, services (e.g., web services), and vulnerabilities. A user may flag an item (e.g., a server) in HPSAV database 606, so that it may be easily identifiable in the future. For example, a user may mark a server or a vulnerability finding in HPSAV database 606 with an interested flag. The interested flag may indicate that imported findings and/or other data which pertain to the server may be of interest to the user. Findings attachments database 608 may include electronic documents that a user may attach to specific findings. An attachment may include an image (e.g., a screen shot), text, or any other form of information that may be obtained, uploaded and/or stored in findings attachments database 608 and a link to the corresponding finding in findings database 602. Other databases 610 may include data or records that do not belong to security assessment unit 304.

Figure 7:
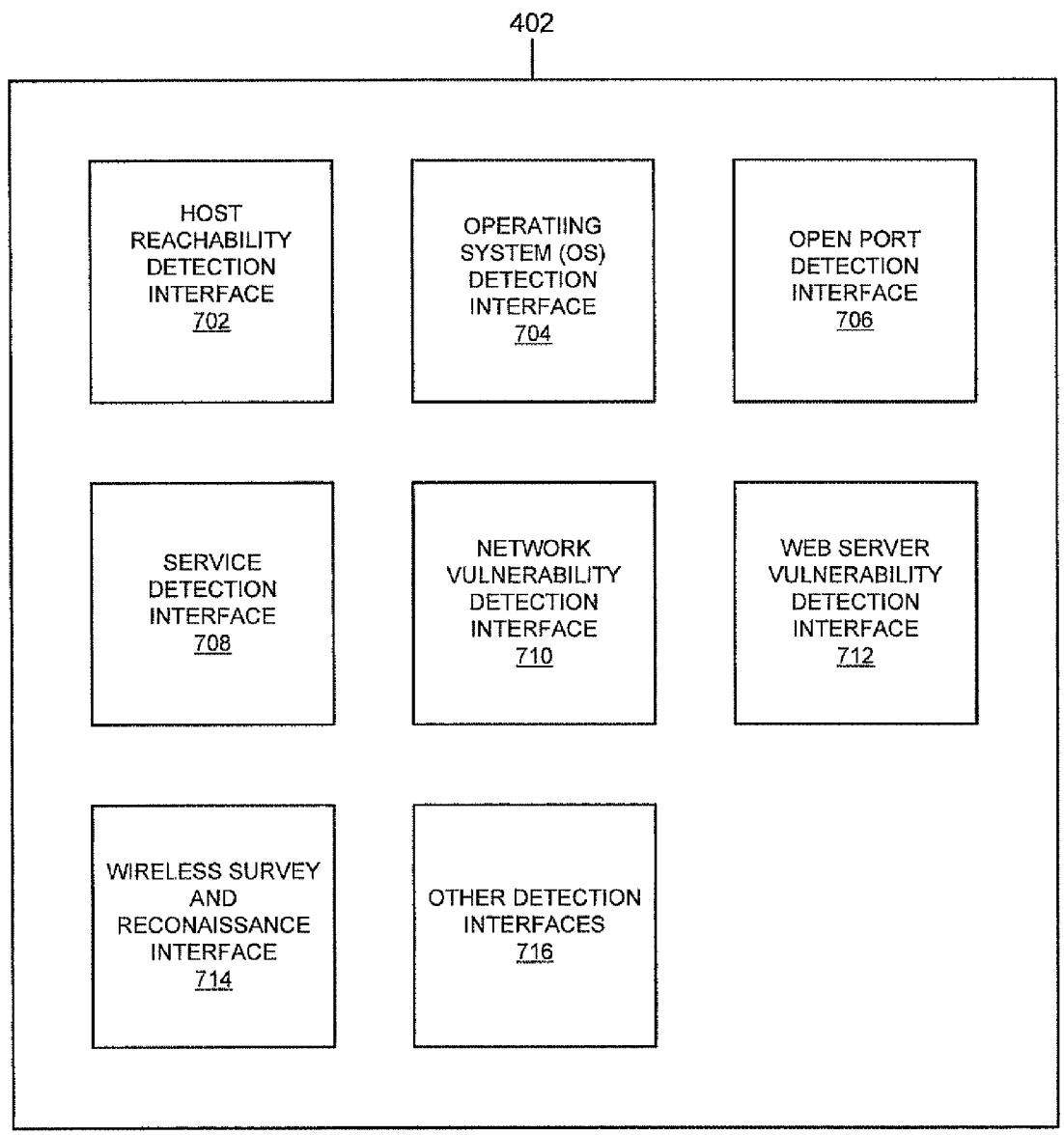
FIG. 7 is a functional block diagram of an exemplary import interface of FIG. 4.

FIG. 7 shows a functional block diagram of an example implementation of import interface 402. As shown, import interface 402 may include host reachability detection interface 702, operating system (OS) detection interface 704, open port detection interface 706, service detection interface 708, network vulnerability detection interface 710, web server vulnerability detection interface 712, wireless survey and reconnaissance (WSAR) interface 714, and other detection interfaces 716. If security tools 306 is modified to include additional tools, import interface 402 may be modified accordingly to include additional or different components, so that import interface 402 can import findings/data from the additional tools. In different implementations, import interface 402 may include fewer, additional, or different components than those shown in FIG. 7.

Host reachability detection interface 702 may include software for importing, from security tools 306, findings and/or other data that indicate if devices on a network are reachable through different communication protocols. For example, host reachability detection interface 702 may import, from security tools 306, findings/data that indicate if a set of hosts are reachable through an Internet Control Message Protocol (ICMP) echo request message (e.g., a ping). Operating system (OS) detection interface 704 may include software for importing, from security tools 306, findings and/or other data that characterize operating systems that are hosted on the network devices. For example, OS detection interface 704 may import, security tool A 502, findings/data that show weaknesses of each of UNIX operating systems that are hosted on the network devices.

Open port detection interface 706 may include software for importing, from security tools 306, findings/data that indicate which communication ports are open on the network devices. For example, open port detection interface 706 may import, from security tool A 502, a list of open ports for each of the devices in the network. Service detection interface 708 may include software for importing, from security tools 306, findings/data that relate what specific services are offered by a device. For example, service detection interface 708 may import data and/or findings that show if a device in network 106 offers an unsecured telnet service and a file transfer protocol (FTP) service.

Network vulnerability detection interface 710 may include software for importing, from security tools 306, findings/data that describe specific vulnerabilities and/or weaknesses (e.g., a finding which indicates that an up-to-date security patch may not have been applied to one of the applications hosted on the devices). Web server vulnerability detection interface 712 may include software for importing, from security tools 306, findings/data about vulnerabilities and/or weaknesses that may be found on web servers (e.g., a finding that indicates if a web server is vulnerable to a denial-of-service attack).

Wireless survey and reconnaissance (WSAR) interface 714 may include software for importing, from security tools 306, findings/data that are obtained as the result of scanning for different wireless networks. The findings may include identification of standard and hidden wireless networks, packets that have been intercepted, etc. Other detection interfaces 716 may include software for importing different types findings/data than those imported by software components 702-714.

In FIG. 7, each of software components 702-716 may include logic that imports findings/data from a specific subset of security tools. For example, operating system (OS) detection interface 704 may import findings from security tool A 502. In another example, WSAR interface 714 may import findings from a wireless network related security tool (e.g., Kismet). In one implementation, software components 702-716 may be adapted to import findings/data from additional or different sets of tools.

Further, each of software components 702-716 may normalize findings/data that are imported from components of security tools 306. In some instances, normalization may involve converting findings/data that are imported from components of security tools 306 in variety of formats to a common format. In other instances, the normalization may entail changing units of measurement. For example, security tool A 502 may classify a severity of vulnerability finding into one of four possible types: low, medium, high, or critical. Another tool in security tools 306 may classify the same vulnerability finding into one of ten possible levels. When import interface 402 imports a finding or data that includes a severity rating on a scale of one to ten, import interface 402 may reset the severity level of the imported findings/data to one of low, medium, high, or critical.

Figure 8:
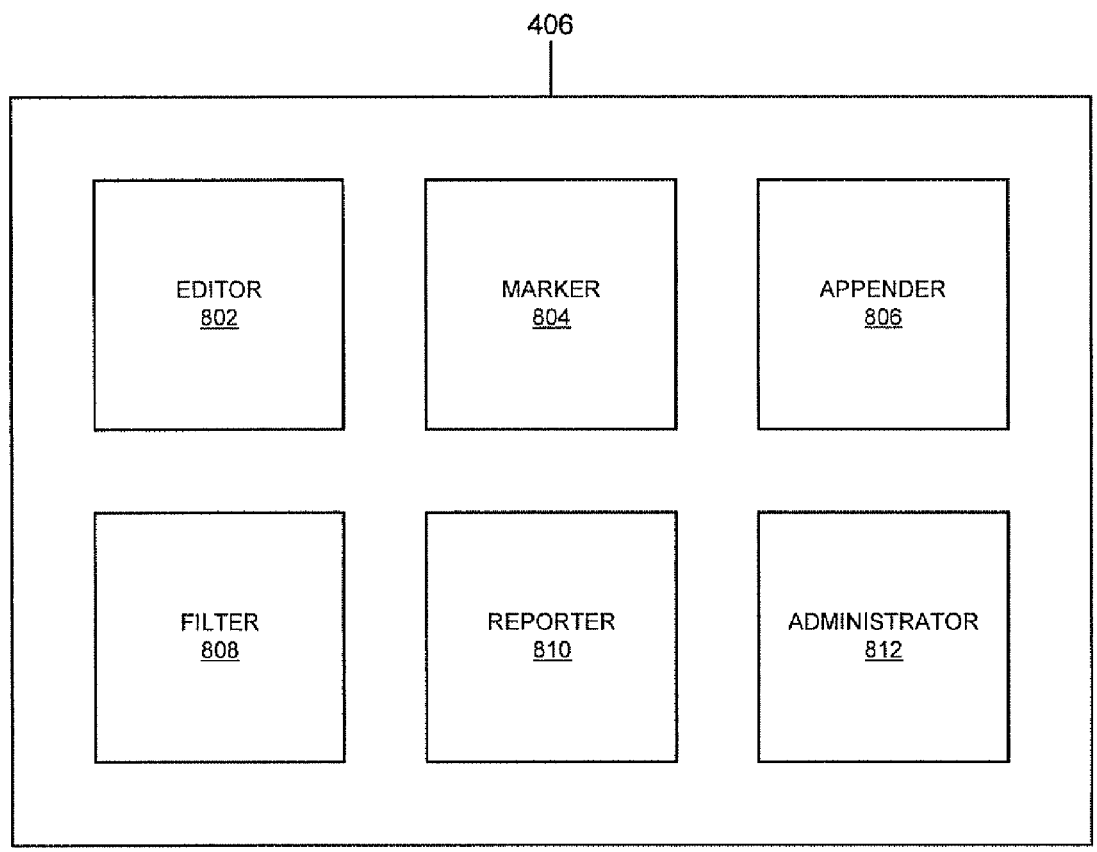
FIG. 8 is a functional block diagram of an exemplary user controls interface of FIG. 4.

FIG. 8 is a functional block diagram of an exemplary user controls interface 406. As shown, user controls interface 406 may include an editor 802, a marker 804, an appender 806, a filter 808, a reporter 810, and administrator 812. The components in user controls interface 406 may receive user commands for an action (e.g., edit a finding) from a user or from corresponding user-activated controls that are loaded in a browser by web server 302. In some implementations, user controls interface 406 may include fewer, additional, or different components. For example, user controls interface 406 may include a component for scheduling automated imports.

Editor 802 may include software for modifying data that is in findings database 602. Editor 802 may be used to modify individual findings, for example, with more accurate details, references, and or descriptions for fortifying devices against vulnerabilities. In addition, editor 802 may allow a user to modify templates (e.g., a collection of different fields) for findings.

Marker 804 may include software for flagging findings or data (e.g., hosts, ports, etc.) in database 308. To flag a finding, marker 804 may be used to set an interested flag. For example, if a user discovers twenty findings within imported data, and considers three of them as being important, the user may mark the three findings as being "interested" via marker 804. Marker 804 may flag data and/or findings for follow up or for reporting.

Appender 806 may include software for attaching comments and/or documents (e.g., references, screen shots, etc.) to a finding. For example, if a user wishes to provide comments or screen shots to document the findings that the user considers as being important, the user may filter the findings based on interested flag and attach a screen shots to the filtered findings.

Filter 808 may include software for filtering findings/data based on factors, such as a severity of a vulnerability finding, presence of a flag that may be added by marker 804, etc. Reporter 810 may include software for creating reports of findings/data in database 308 and for exporting the findings/data to other applications (e.g., an external security tool). Administrator 812 may include software for creating, deleting, and/or editing projects and maintaining authentication and access privilege information associated with each project (e.g., grant or deny access privileges to other users). Project and/or authentication and access privilege information that is maintained or modified via administrator 812 may be stored in projects and security database 604.

Figure 9:
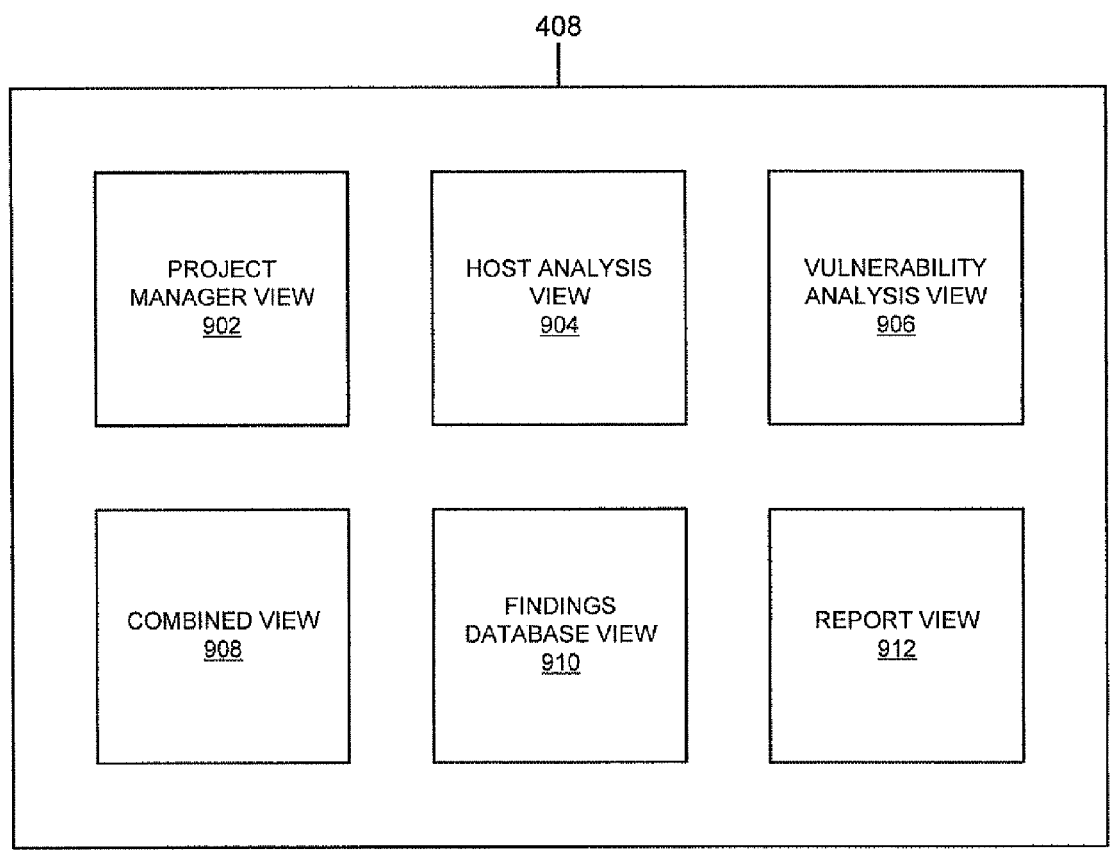
FIG. 9 is a functional block diagram of an exemplary presentation interface of FIG. 4.

FIG. 9 is a functional block diagram of exemplary presentation interface 408. As shown, presentation interface 408 may include a project manager view 902, a host analysis view 904, a vulnerability analysis view 906, a combined view 908, a findings database view 910, and a report view 912. In other implementations, presentation interface 408 may include fewer, different, or additional components than those illustrated in FIG. 9. For example, presentation interface 408 may include a component for presenting a view for administering security (e.g., granting access privileges).

Figure 10:
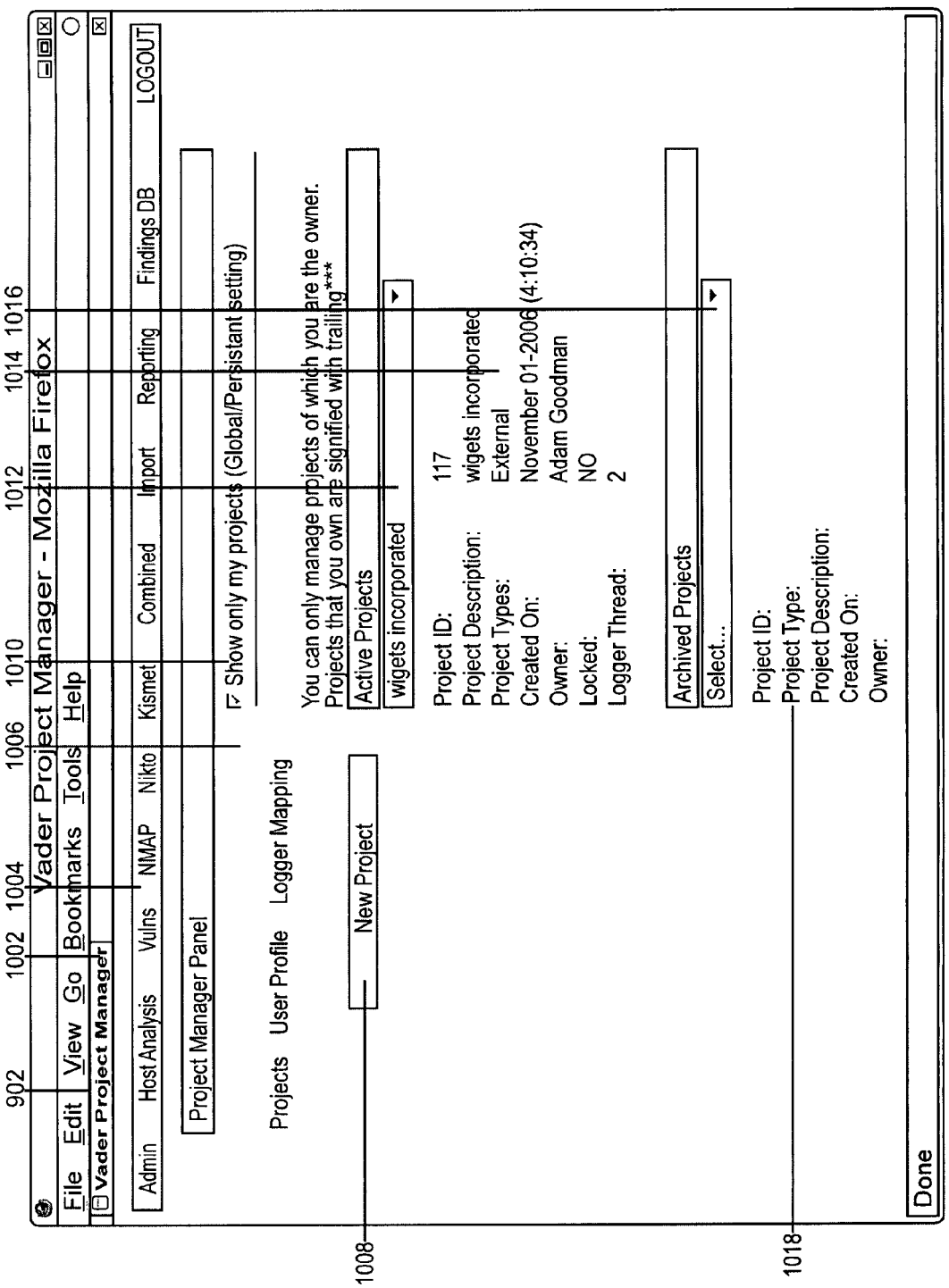
FIG. 10 is a diagram of an exemplary browser that shows a project manager view of FIG. 9.

Project manager view 902 may provide a user interface for administering projects and/or security information associated with the projects. FIG. 10 shows an exemplary browser illustrating project manager view 902. The browser may be installed on client device 102. As shown, project manager view 902 may include a tab 1002, a menu bar 1004, and a presentation pane 1006. Activating and/or using one or more of the components in project manager view 902 may cause the components in user controls interface 406 (e.g., administrator 812) to access part of database 308 (e.g., projects and security database 604).

Tab 1002 may indicate the name of the current view. Menu bar 1004 may show a list of major views (e.g., "Admin," "host analysis," "NMAP," etc.) that are selectable. For example, if "host analysis" is selected from menu bar 1004, the browser may switch to host analysis view 904 from project manager view 902. Presentation pane 1006 may include a display area in which information related to a particular view may be displayed. For example, in FIG. 10, presentation pane 1006 shows information for managing projects. Each of tab 1002, menu bar 1004, and presentation pane 1006 may be available in other views, such as host analysis view 904, vulnerability analysis view 906, combined view 908, findings database view 910, etc.

As further shown in FIG. 10, presentation pane 1006 may include a new project button 1008, a project group selector 1010, an active project selector 1012, an active project summary 1014, an archived project selector 1016, and an archived project summary 1018. New project button 1008 may be activated by one of I/O devices 208 (e.g., by right-clicking a mouse when the mouse cursor hovers over project button 1008). Further, activating new project button 1008 may open a new view that allows a user to input parameters that are associated with a new project, such as the name of the new project, security parameters (e.g., parameters that indicate which users are allowed to access the project), etc.

Project group selector 1010 may include a checkbox that allows a user to reduce a list of selectable projects in active project selector 1012 and archived project selector 1016. Active project selector 1012 may allow a user to select one of active projects in a list that is displayed if a pull down menu button on its right is activated. Project summary 1014 may include fields that provide a brief description of the project that is selected by active project selector 1012. For example, the fields may include a project identifier field, a brief description field, a type of project field, the date/time of its creation, an owner, etc. In different implementations, project description 1014 may include other fields, such as a field that indicates the last modification date/time of the project, etc.

Archived project selector 1016 may allow a user to select an archived project in a list that is displayed if a pull down menu button on its right is activated. In some implementations, archived projects may include older projects on a storage medium that is larger and has a slower access time than those used to store active projects. Archived project summary 1018 may provide similar information as active project summary 1014.

Returning to FIG. 9, host analysis view 904 may provide a user interface for viewing information about hosts. FIG. 11 shows an exemplary browser illustrating host analysis view 904. As shown, host analysis view 904 may include a project selector 1102, a host display 1104, a display modifier 1106, a severity filter selection list 1108, and a host filter selection list 1110. Activating and/or using one or more of the components in host analysis view 904 may cause marker 804, filter 808, administrator 812 and/or other components in user controls interface 406 to access projects and security database 604, HPSAV database 606 and other databases in database 308. In other implementations, host analysis view 904 may include fewer, different, or additional fields and/or components than those illustrated in FIG. 11.

Project selector 1102 may allow a user to select a project in a list that is displayed if a pull down menu button on its right is activated, in a manner similar to active project selector 1012. Host display 1104 may include an area that shows a list of hosts. In FIG. 11, host display 1104 shows IP addresses of hosts and Domain Name System (DNS) names. In other implementations, host display 1104 may show other types of information, such as a device type (e.g., router, computer, etc.). Display modifier 1106 may provide options for users to change host display 1104. For example, in FIG. 11, if a checkbox for display modifier 1106 is not checked, host display 1104 may show only IP addresses of the hosts.

Severity filter selection list 1108 may include a list of options for viewing hosts with varying levels of vulnerabilities. For example, in FIG. 11, severity filter selection list 1108 includes options such as "Filter Host(s) with High Severity findings," "Filter Host(s) with Medium Severity findings (or greater)," etc. Selecting one of the options in severity filter selection list 1108 may cause filter 808 to select a subset of the hosts in host display 1104 based on a security level associated with the selected item and may cause host display 1104 to show the subset.

Host filter selection list 1110 may include a number of options for viewing a subset of hosts based on ad-hoc filtering. For example, in FIG. 11, host filter selection list 1110 includes options such as "All hosts in project," "NMAP pingscan—hosts pingable," "NMAP port scan—hosts with open ports," etc. Selecting one of the items in host filter selection list 1108 may cause filter 808 to select a subset of the hosts in host display 1104, and cause host display 1104 to show the subset.

Figure 12:
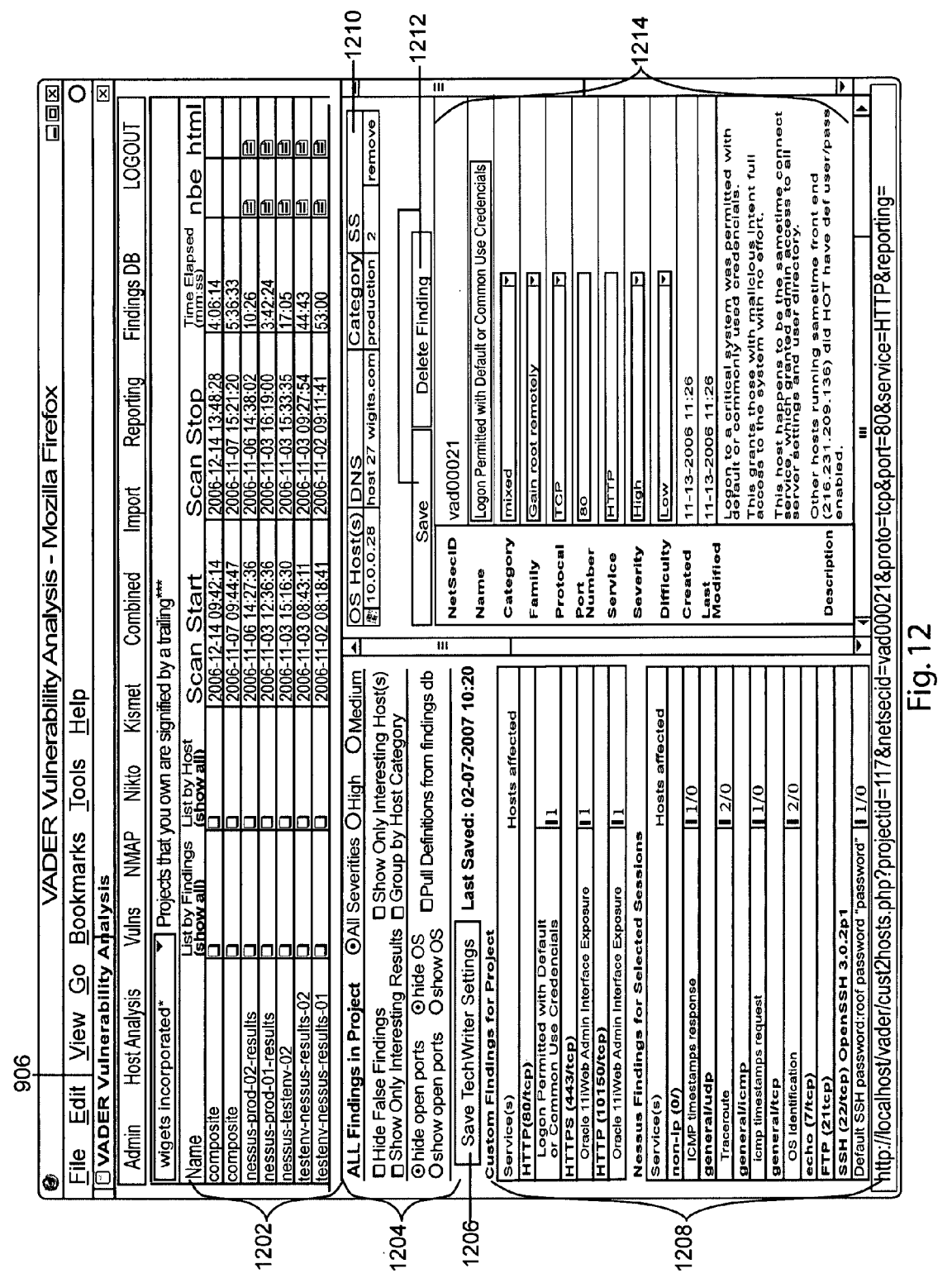

Returning to FIG. 9, vulnerability analysis view 906 may provide a user interface for viewing vulnerability findings. FIG. 12 shows an exemplary browser illustrating vulnerability analysis view 906, where findings are grouped based on vulnerabilities associated with the findings. As shown, vulnerability analysis view 906 may include a session list 1202, findings/data selectors 1204, a settings save button 1206, findings summary 1208, a host list 1210, save/delete findings buttons 1212, and a findings display 1214. Activating and/or using one or more of the components in vulnerability analysis view 906 may cause editor 802, filter 808, and/or other components in user controls interface 406 to access findings database 602, projects and security database 604, HPSAV database 606 and/or other databases in database 308.

Session list 1202 may include a list of transcripts of different vulnerability testing sessions from which findings/data are imported into a project. Each session in session list 1202 may include the name of the session, checkboxes that indicate how findings in the session are to be presented, the start time of the session, the end time of the session, and file formats in which transcripts of the session may be available.

Findings/data selectors 1204 may provide options for viewing a subset of findings and/or hosts. For example, a set of radio buttons may be provided for selecting and viewing findings based on the severity of vulnerability. In another example, an option may be provided for selecting whether the subset of findings may display information about open ports. In yet another example, an option may be provided for controlling whether the subset of findings may display information about operating systems.

Settings save button 1206 may allow a user to save different viewing options or output options that may be set at findings/data selectors 1204.

Findings summary 1208 may include a summary of findings that are provided by sessions in session list 1202. For example, findings summary 1208 may include a custom findings summary (e.g., findings that may have been edited by a user) and a tool findings summary. For custom findings, findings summary 1208 may show a number of servers that have failed Hypertext Transfer Protocol (HTTP) related tests. For tool findings summary, findings summary 1208 may show a numbers of servers that have failed tests which are administered by a specific security tool (e.g., security tool A 502).

Host list 1210 may include a list of items about hosts at which vulnerabilities are found. Each item in host list 1210 may include parameters associated with a host, such as a hostname, the IP address of the host, a type of host, etc. Save/delete findings buttons 1212 may provide buttons for saving or removing a finding.

Findings display 1214 may provide a user interface for viewing and/or editing a finding. As shown in FIG. 12, findings display 1214 may include fields for parameters, such as a net security (NetSec) identifier (ID), a name of the finding, a category in which the finding belongs, a communication protocol that is related to the finding, a port number, a description of the finding, etc. A finding in findings display 1214 may be modified by changing contents of the fields and by activating save/delete findings buttons 1212.

Figure 13:
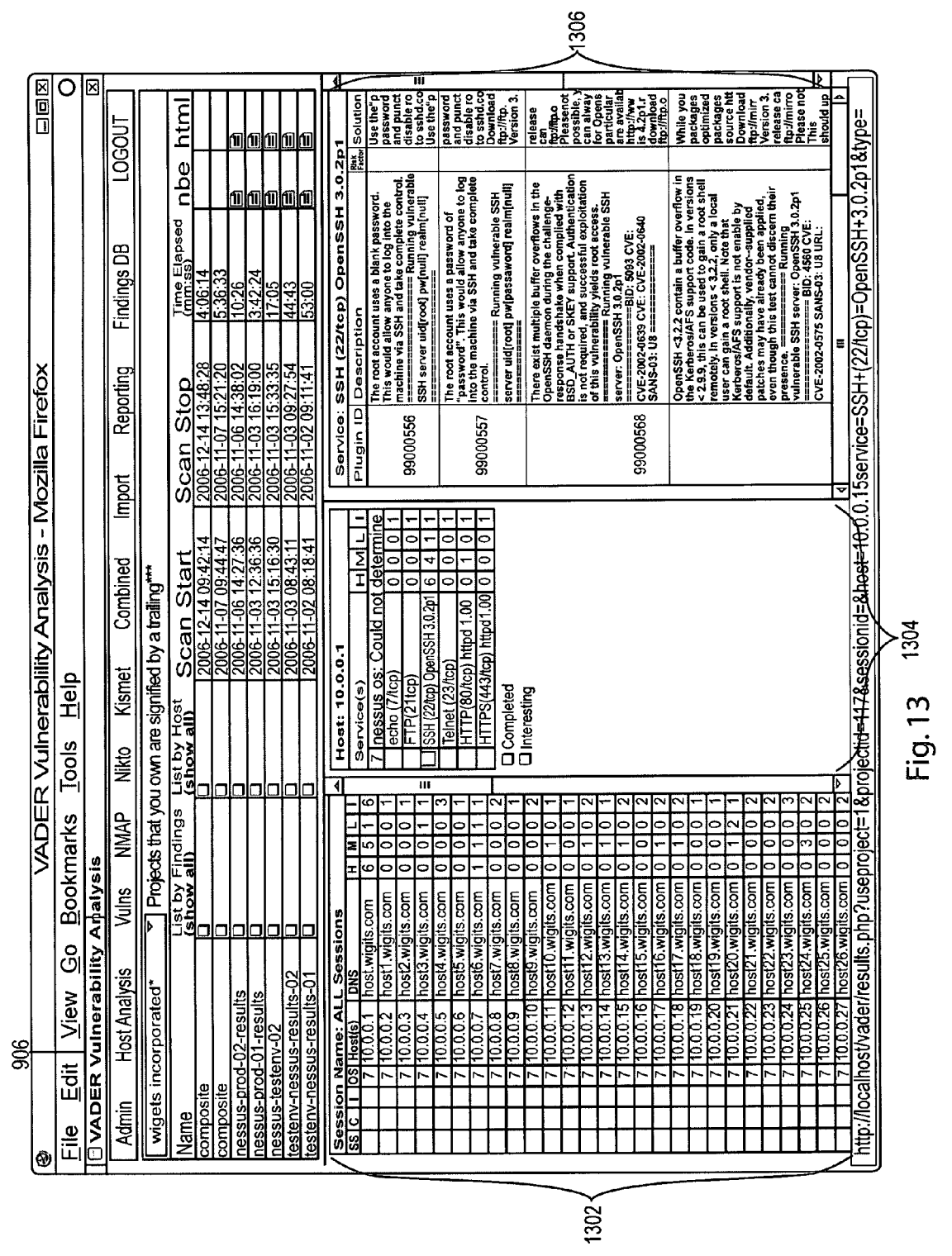

FIG. 13 shows another vulnerability analysis view 906, in which findings are grouped by hosts. As shown, vulnerability analysis view 906 may include a detailed host list 1302, a host finding summary 1304, and a host findings display 1306. Activating and/or using one or more of the components in FIG. 13 may cause marker 804, filter 808, and/or other components in user controls interface 406 to access findings database 602, HPSAV database 806 and/or other databases in database 308.

Detailed host list 1302 may include a list of hosts in a selected session in session list 1202. Each item in detailed host list 1302 may include fields such as a host name field, an IP address field, an operating system field, a high vulnerability level field (e.g., a field that shows the number of findings with a high severity), medium vulnerability level field, an interested field (e.g., a field that shows a number of findings that have been marked by a user as being interesting), etc. The interested field may be used to mark and/or track findings that the user considers as being important. One or more of the hosts in detailed host list 1302 may be selected.

Host findings summary 1304 may provide a brief summary of findings for selected hosts in detailed host list 1302. A user may select one of the items listed in host findings summary 1304. Each item in host findings summary 1304 may represent a type of vulnerability finding.

Each item in host findings summary 1304 may include parameter fields, such as the finding type field (e.g., a field that identifies the type of vulnerability finding, such as echo, FTP, etc.), a high vulnerability level field, a medium vulnerability level field, an interested field, etc. In addition, host findings summary 1304 may indicate whether the selected host is designated by a user as being "interesting" and/or "completed."

Host findings display 1306 may include descriptions of vulnerability findings for the selected type of findings in host findings summary 1304. In addition, host findings display 1306 may identify a plug-in module that may have discovered each vulnerability finding.

Figure 14:
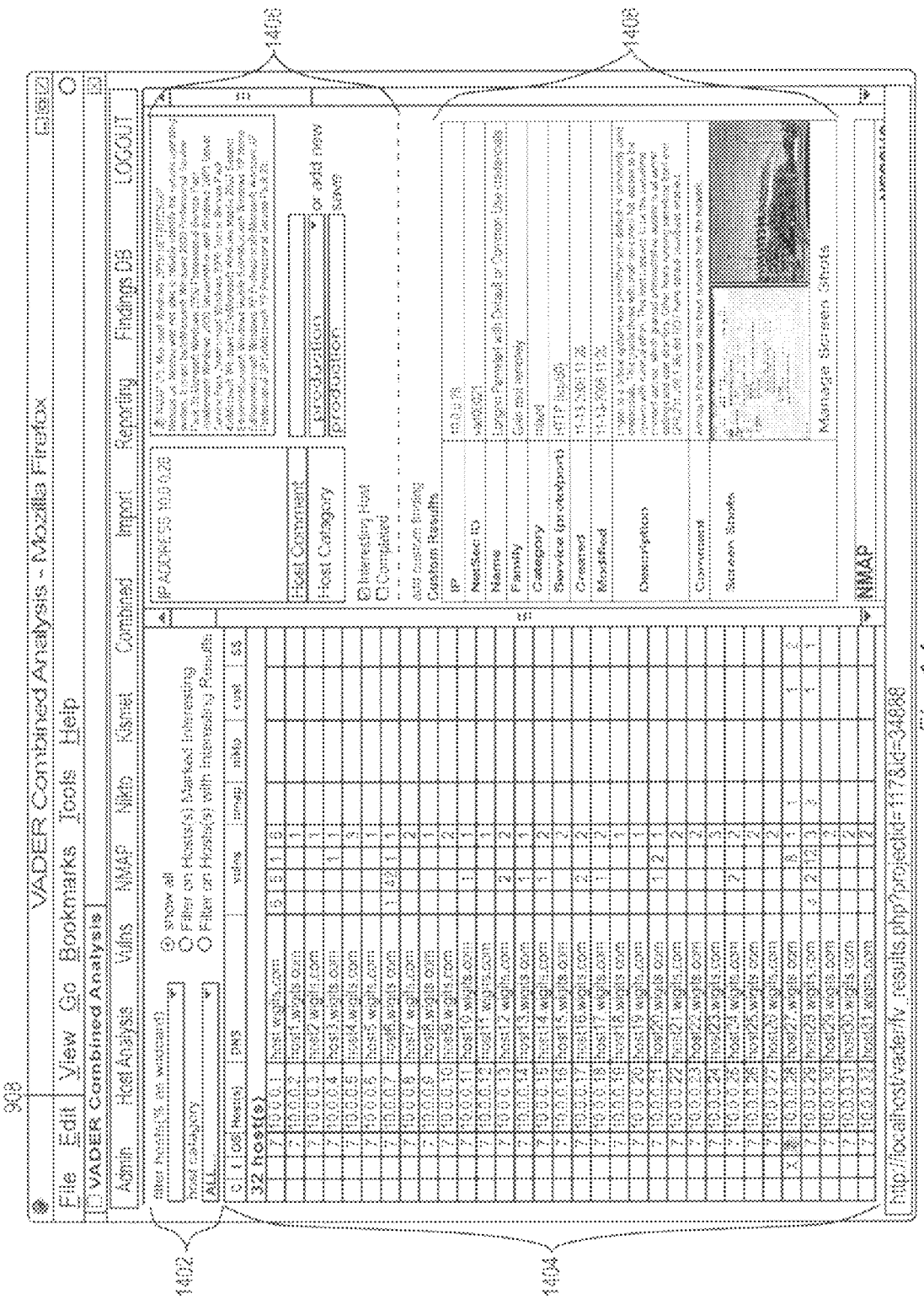
FIG. 14 is a diagram of an exemplary browser that shows a combined analysis view of FIG. 9.

Returning to FIG. 9, combined view 908 may provide a comprehensive view of all data in a project. FIG. 14 shows an exemplary browser illustrating combined view 908. As shown, combined view 908 may include combined data filters 1402, a combined hosts display 1404, a selected host description 1406, and a customized findings display 1408. Activating and/or using one or more of the components in combined view 908 may cause marker 804, filter 806, and/or other components in user controls interface 406 to access findings database 602, projects and security database 604, HPSAV database 806, findings attachments database 808, and/or other databases in database 308. In other implementations, combined view 908 may include fewer, different, or additional components than the ones illustrated in FIG. 14.

Combined data filters 1402 may provide filters for selecting a subset of hosts in a project. In FIG. 14, combined data filters 1402 may allow a user to filter hosts based on a name or a character string and by host category. In addition, combined data filters 1402 may permit a user to filter hosts based on a flag that indicates if a host is marked as interesting or a flag that indicates if at least one of the findings for the hosts is marked as interesting.

Combined hosts display 1404 may include a list of items about hosts. Each item may include parameters related to a host, such as a host name, an IP address of the host, a number of findings that are associated with a high vulnerability, the names of security tools from which information about the host may have been imported, etc. A user may select a host in combined hosts display 1404.

Selected host description 1406 may include a brief description of the host that is selected in combined host display 1404. The description may include information about the operating system that might be running on the selected host, a type of host, etc. In FIG. 14, selected host description 1406 may indicate whether the host has been flagged by a user as being interesting or completely tested.

Figure 15:
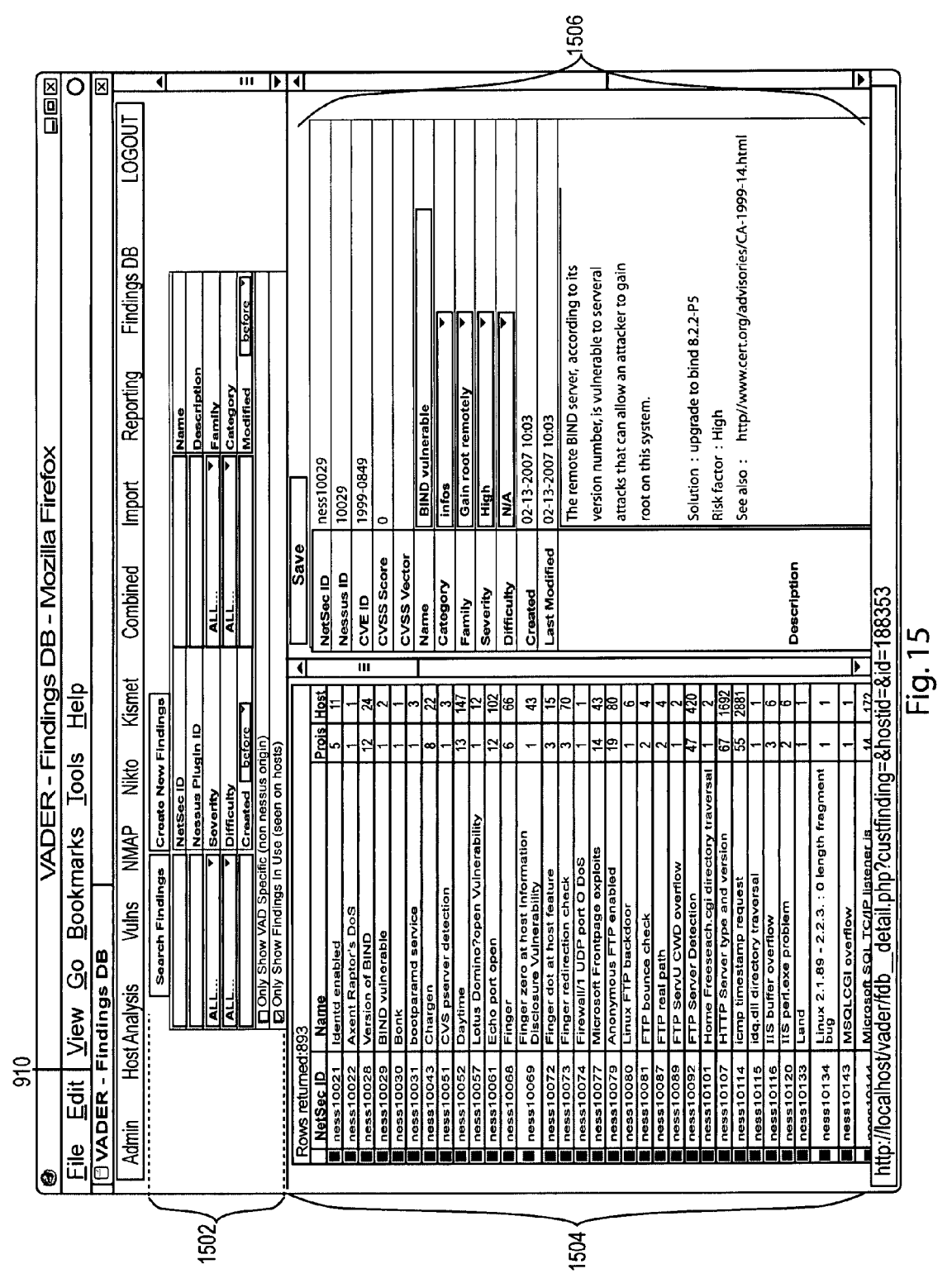

Customized findings display 1408 may show customized findings. Each customized finding may include fields for parameters such as the IP address of the host that is selected in combined hosts display 1404, a NetSec ID, a name of the customized finding, a service type to which the finding pertains, the creation date of the customized finding, the modification date of the customized finding, screen shots that are inserted into database 308 and associated with the finding, etc Returning to FIG. 9, findings database view 910 may provide a user interface for viewing and/or modifying database 308. FIG. 15 shows an exemplary browser illustrating findings database view 910. As shown, findings database view 910 may include a query/creation area 1502, a findings list 1504, and a findings display 1506. Activating and/or using one or more of the components in findings database view 910 may cause one or more components in user controls interface 406 to access database 308.

Query/creation area 1502 may include fields for inputting parameters that characterize a set of findings. The parameters may include a NecSec ID, a plug-in ID (e.g., an identifier for a software component), a level of severity, creation dates of the findings, etc. A user may input values in the fields, submit the values to security assessment unit 304, and request a search based on the input values or insert a new finding into database 308.

Findings list 1504 may include a list of findings. As shown, for each finding, findings list 1504 may show parameters, such as a NetSec ID, the name of the finding, a number of projects that may reference the finding, and a number of hosts in which the finding are discovered. Findings list 1504 may permit a user to select one of the findings in the list.

Findings display 1506 may show parameters that are associated with a finding that is selected in findings list 1504. Parameters may include a NetSec ID, a security tool ID (e.g., an internal identifier that is provided by a security tool), a common vulnerability and exposure (CVE) ID (e.g., a standard identifier for a vulnerability), a common vulnerability scoring system (CVSS) score (e.g., a standard for measuring vulnerability), a CVSS vector (e.g., a parameter that defines the metric used to compute the CVSS score), a name of the finding, etc. Some of the parameters in findings display 1506 may be modified and saved in database 308.

Returning to FIG. 9, report view 912 may provide a user interface for outputting export files and/or reports. A report may include organized and formatted information about findings. An export file may include information about findings that can be loaded into another application.

Figure 16:
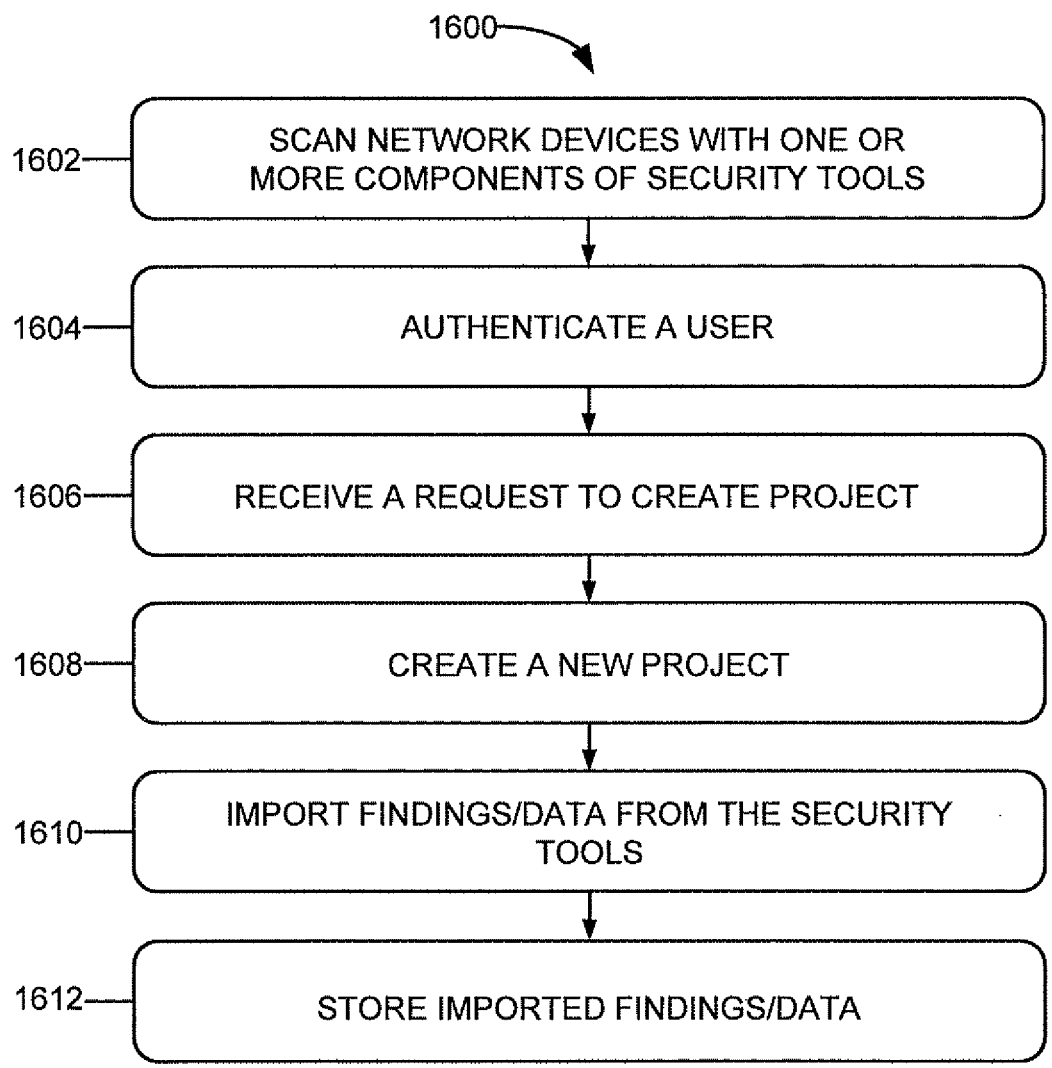
FIG. 16 shows an exemplary process for creating a project and populating the project with data.
Figure 17:
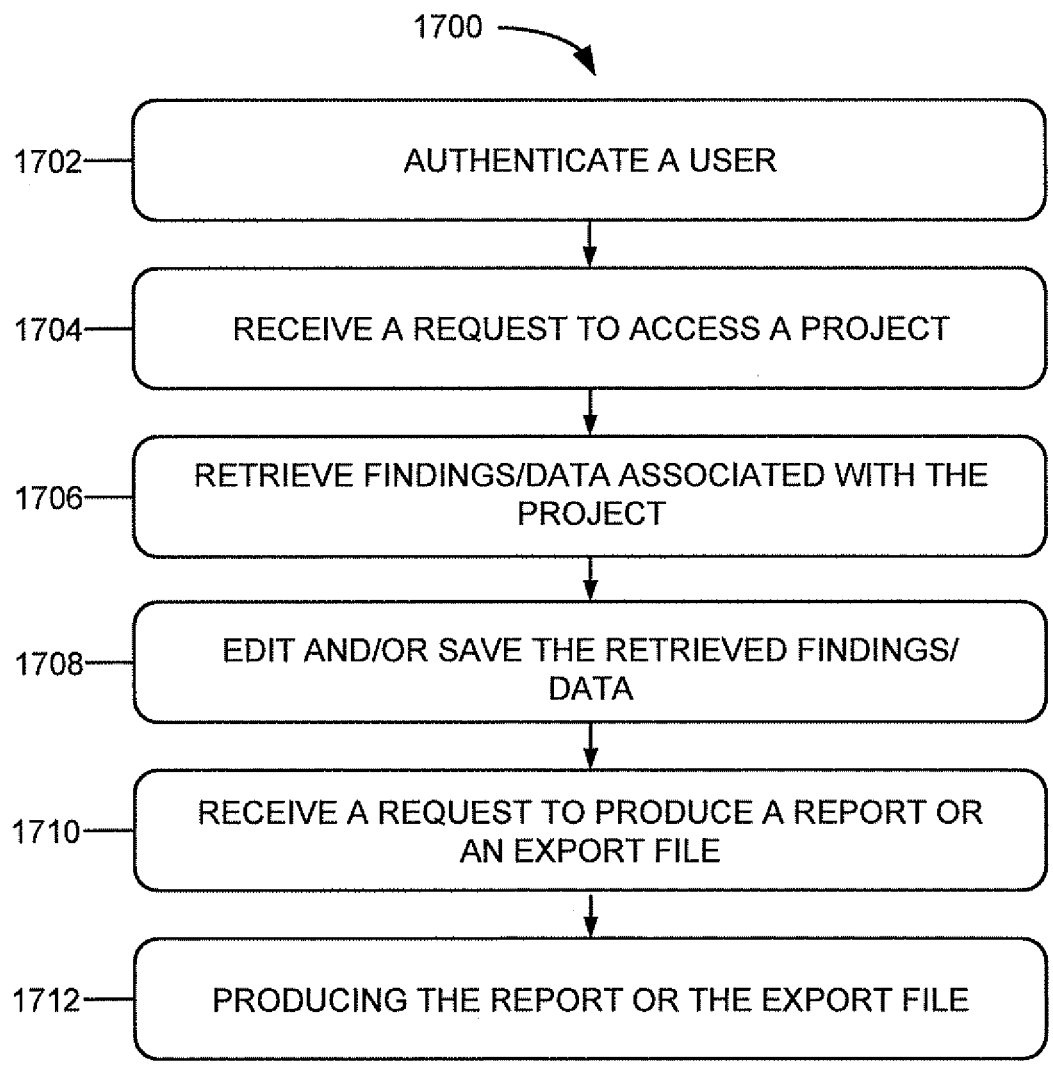
FIG. 17 shows an exemplary process for accessing a project and/or producing a report.

The above paragraphs describe components and devices that are related to importing findings/data from security tools, viewing and editing the findings/data, adding supporting documentation to the findings/data, and generating reports/export files about the findings/data. The components and devices described above may include not only devices that host security assessment unit 304 and the subcomponents of security assessment unit 304, but also other components that operate in conjunction with security assessment unit 304, such as web server 302, security tools 306 and database 308. FIGS. 16 and 17 depict exemplary processes that are capable of being performed on one or more of these devices and/or components.

FIG. 16 shows an exemplary process for creating a project and populating the project with data. As shown in FIG. 16, process 1600 may begin by scanning network devices with one or more components of security tools 306 (block 1602). For example, security tool A 502 may scan network devices to identify open ports. The components of security tools 306 may generate files and/or logs that include vulnerability findings for hosts/ports. Findings from different security tools may be written in files with different data formats and/or measurement units.

A user may be authenticated (block 1604). For example, if a user inputs a user identifier (ID) and a password to an authentication page of security assessment unit 304, security assessment unit 304 may access projects and security database 604 and authenticate the user. The authentication may be based on a password and/or user identifier (ID) that may have been previously issued to the user by a security assessment unit 304 administrator. In some implementations, a user may be provided with a user ID and a password upon registering the name and an email address of the user at a web site for security assessment unit 304. If a user is not authenticated, the user may not be allowed to access security assessment unit 304.

A request to create a project may be received (block 1606). If the user is authenticated, the user may switch to project manager view 902 by using menu 1004. In project manager view 902, the user may activate new project button 1008 to create the new project.

A new project may be created (block 1608). If the user submits the request to create a new project, the user may be provided with a new view that permits the user to designate the project name and/or other characteristics associated with the project (e.g., authentication information for a project). In addition, the user may specify output files of security tools 306 from which data may be imported. The new project may be stored in database 308.

Findings/data from the security tools may be imported from the security tools (block 1610). Importing the selected data may involve normalizing the selected findings/data.

Imported findings/data may be stored in database 308 (block 1612).

FIG. 17 shows an exemplary process for accessing and interacting with a project and/or producing a report. At block 1702, a user may be authenticated. The authentication may be performed in a manner similar to the authentication at block 1604.

A request to access a project may be received (block 1704). For example, user may switch to project manager view 902 and use active project selector 1012 (FIG. 10) or an archived project selector 1016 to select and access a project. If the user wishes to access a project that the user created, the user may employ project group selector 1010. Activating project group selector 1010 may restrict the selectable projects available through active project selector 1012/archived project selector 1016 to those created by the user. Selecting a project may cause a request for the project to be sent to and received by security assessment unit 304.

Findings/data associated with the project may be retrieved (block 1706). Security assessment unit 304 may employ administrator 812 and/or filter 806 to retrieve findings/data that are associated with the selected project from database 308. The retrieved findings/data may be sent back to the user via presentation interface 408 and/or web server 302.

The retrieved findings/data may be edited and/or saved (block 1708). The user may select and use specific views (e.g., vulnerability analysis view 906 (see FIG. 12), findings database view 910 (see FIG. 15), etc.) to edit and/or save one or more data/findings.

Editing may involve marking and annotating findings/data the user considers important. For example, if a user imports twenty vulnerability findings from a security tool, and discovers that three of the twenty findings are important, the user may mark the three findings as being "interesting" via marker 804. In addition, the user may provide comments and/or attach screens shot via appender 806 to further document the vulnerability of the findings.

A user request for a report or an export file may be received (block 1708). The user request may be made at report view 912, which may cause reporter 810 to generate a report and/or an export file for the findings/data. The report may contain comments and/or screen shots that may have been appended to the findings/data. In some implementations, the generated report/export file may be loaded into report view 912, so that the user may examine and/or edit the report and/or the export file.

Many changes to processes, devices, and/or components described above may be implemented. For example, in other implementation, process 1600 or 1700 may incorporate acts for scheduling imports from security tools 306. In yet another example, process 1600/1700 may incorporate acts in which a user may grant different types of access privileges (e.g., edit privilege, read privilege, etc.) to others users.

Figure 18:
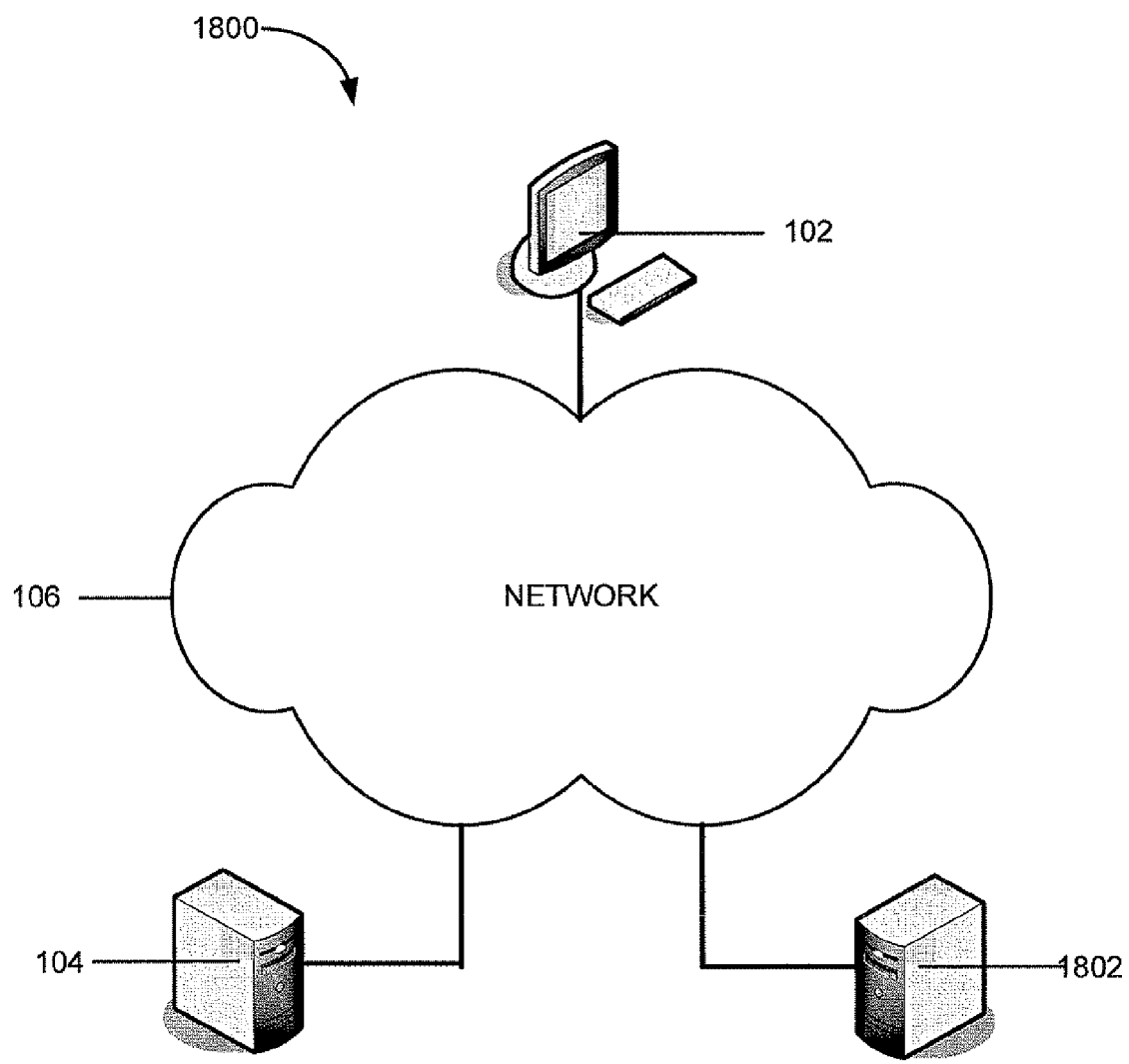
FIG. 18 shows another exemplary environment in which concepts described herein may be implemented.

The following example illustrates processes that may be involved in using security assessment unit 304, with reference to FIG. 12 and FIG. 18. The example is consistent with exemplary processes 1600/1700 described above with reference to FIGS. 16 and 17.

FIG. 18 shows another exemplary environment in which concepts described herein may be implemented. As shown in FIG. 18, system 100 may include the components of FIG. 1 and a web server device 1802. Assume for the sake of example that security tool A 502 has finished scanning network 106 and has generated a file called nessus-testenv-02.nbe. In addition, assume that the file contains information about a vulnerability finding about web server device 1802. More specifically, the vulnerability finding indicates that web server device 1802 has allowed a logon to occur with commonly used credentials. In addition, assume that a user has access privileges to server device 104.

In the example, the user may authenticate at a security assessment web site provided by web server 302 on server device 104. The user may access project manager view 902 (see FIG. 9 and FIG. 10), create a new project called "wigets incorporated," and import data from nessus-testenv-02.nbe. During the import, values of parameters that have been provided by security tool A 502 are normalized.

The user may use host analysis view 904 to select "All severities," "hide open ports," and "hide OS" in findings/data selector 1204. Host analysis view 904 is updated, so that host analysis view 904 shows findings summary 1208 (FIG. 12) that includes the finding about web server device 1802. When the user selects the finding in findings summary 1208, details of the finding may be shown in findings display 1214.

The user may change one or more of parameters that are shown in findings display 1214, such as its description, the name of the finding, the protocol, etc. In addition, the user may mark the finding, provide a comment for the finding, and/or attach a screen shot to the finding via appender 806 to further document the vulnerability of the finding.

After making desired changes, the user may insert the changes into database 308.

The user may decide to obtain a copy of a report. To obtain the copy, the user may activate "Reporting" item in menu 1004 and arrive at report view 910. From report view 910, the user may change parameters related to a report (e.g., formatting parameters, such as double spacing, etc.) and print out the report.

The above example illustrates how security assessment unit 304 and related components may be used to import data from security tools, normalize the imported data, present a view of the imported data from the security tools, edit a finding, add supporting documentation to the finding, and generate reports about the finding. By using security assessment unit 304, evaluating vulnerability findings may be facilitated.

The foregoing description of implementations provides an illustration, but is not intended to be exhaustive or to limit the implementations to the precise form disclosed. Modifications and variations are possible in light of the above teachings or may be acquired from practice of the teachings.

In addition, while series of blocks have been described with regard to the processes illustrated in FIGS. 16 and 17, the order of the blocks may be modified in other implementations. Further, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more processors, the method comprising:
    creating, by the one or more processors, a project that includes one or more assessment criteria selected by a user from a plurality of assessment criteria;
    obtaining, from a plurality of different network security tools associated with the one or more processors, assessment data associated with one or more network devices, for a particular assessment criterion of the one or more assessment criteria, wherein the assessment data includes a first data file in a first format and a second data file in a second format that differs from the first format, and a first unit of measurement and a second unit of measurement for the particular assessment criterion, wherein the first unit of measurement differs from the second unit of measurement;
    normalizing, by the one or more processors, the assessment data including at least one of converting the first data file to the second format or converting the first unit of measurement to the second unit of measurement;
    organizing, by the one or more processors, the normalized assessment data to form the project; and
    providing a user interface utilized in outputting at least one of a report or an export file including the normalized assessment data.

2. The method of claim 1, further comprising:
    scanning the one or more network devices, using the plurality of different network security tools, to produce the assessment data.

3. The method of claim 1, wherein normalizing the assessment data includes:
    rearranging fields of the first data file.

4. The method of claim 1, wherein normalizing the assessment data includes:

recalibrating one or more fields of the first unit of measurement.

5. A method performed by one or more processors, the method comprising:
receiving a request for a report associated with a stored project;
retrieving normalized assessment data associated with the stored project, in response to receiving the request, the normalized assessment data being associated with one or more network devices and having been acquired, by a plurality of different network security tools associated with the one or more processors, in a plurality of different formats containing a plurality of different units of measurement for a particular assessment criterion, wherein the normalized assessment data comprises at least one of a common format or a single unit of measurement for the particular assessment criterion;
filtering the normalized assessment data based on user-specified criteria, and
producing the report using the filtered normalized assessment data.

6. The method of claim 5, further comprising:
selectively appending documents, including user comments related to a portion of the normalized assessment data, to the portion of the normalized assessment data.

7. The method of claim 6, wherein selectively appending documents includes:
appending screen shots, generated by user input, to the portion of the normalized assessment data.

8. The method of claim 5, wherein the normalized assessment data includes a plurality of testing result findings, and wherein the method further comprising:
selectively marking fewer than all of the plurality of testing result findings in the normalized assessment data with a flag.

9. The method of claim 5, further comprising:
modifying a severity level, corresponding to a first scale, associated with a particular testing result finding in the retrieved normalized assessment data, to correspond to a second scale indicative of the single unit of measurement.

10. The method of claim 5, further comprising:
adding a network security tool to the plurality of different network security tools;
using an import interface to import additional assessment data, with respect to the one or more network devices for the particular assessment criterion, from the additional network security tool; and
associating the additional assessment data with the stored project.

11. The method of claim 5, further comprising:
selectively granting and denying access privileges, associated with the stored project, to a plurality of users attempting to access the stored project.

12. The method of claim 5, further comprising:
using the different network security tools to obtain a plurality of output files that contain pre-normalized assessment data.

13. A system comprising:
a plurality of different network security tools to acquire assessment data for one or more network devices, wherein the acquired assessment data comprises a plurality of different formats containing a plurality of different units of measurement for a particular assessment criterion;
at least one database; and
a security assessment unit coupled to the at least one database and at least one hardware processor, the security assessment unit including:
an import controller unit configured to:
import the acquired assessment data from the plurality of different network security tools, and
reconcile the acquired assessment data with respect to the plurality of different formats and the plurality of different units of measurement,
a database interface controller unit configured to:
store the reconciled assessment data in the at least one database, and
retrieve the reconciled assessment data from the at least one database, and
a presentation controller unit to:
provide a view of a subset of the reconciled assessment data, the subset being specified by a user of the system and accessed through the database interface controller unit, and
provide a user interface utilized in creating a report or an export file associated with the reconciled assessment data.

14. The system of claim 13, wherein the at least one database include at least one of:
a findings database that stores security findings;
a project database that stores projects, each project including some of the imported reconciled assessment data; and
an attachments database that includes electronic documents that are associated with the security findings.

15. The system of claim 13, wherein the acquired assessment data includes information about hosts, ports, services, and vulnerabilities associated with the one or more network devices.

16. The system of claim 13, wherein the import controller unit is to import data related to:
reachable hosts in a network;
operating systems on the reachable hosts;
vulnerability of web services;
application services; and
wireless networks.

17. The system of claim 13, wherein the security assessment unit further includes:
a user controller unit to:
receive user commands via the presentation controller unit;
filter the reconciled assessment data, based on the user commands, provided by the database interface controller unit;
provide the filtered reconciled assessment data to the presentation controller unit.

18. The system of claim 17, wherein the user controller unit is further configured to allow an authorized user to:
mark select portions of the reconciled assessment data with flags;
edit select portions of the reconciled assessment data; and
remove select portions of the reconciled assessment data.

19. The system of claim 17, wherein the user controller unit is further configured to allow an authorized user to:
append documents to the reconciled assessment data; and
produce the report or the export file to include the appended documents.

20. The system of claim 13, wherein the subset of the reconciled assessment data includes information for the presentation controller unit to provide the user interface for:
managing projects associated with the reconciled assessment data;

analyzing hosts associated with the reconciled assessment data;

analyzing vulnerabilities associated with the reconciled assessment data; and accessing a findings database in the databases associated with the reconciled assessment data.

21. The system of claim 13, wherein the system further includes:

a first network device that includes the databases;

a second network device that includes the security assessment unit; and a third network device that includes the plurality of different network security tools.

* * * * *